United States Patent [19]

van der Wal et al.

[11] Patent Number: 5,276,513
[45] Date of Patent: Jan. 4, 1994

[54] IMPLEMENTATION ARCHITECTURE FOR PERFORMING HIERARCHICAL MOTION ANALYSIS OF VIDEO IMAGES IN REAL TIME

[75] Inventors: Gooitzen S. van der Wal, Lawrenceville; Joseph O. Sinniger, Pennington, both of N.J.; Charles H. Anderson, La Canada, Calif.

[73] Assignee: RCA Thomson Licensing Corporation, Princeton, N.J.

[21] Appl. No.: 896,771

[22] Filed: Jun. 10, 1992

[51] Int. Cl.⁵ .................................. H04N 7/137
[52] U.S. Cl. .......................... 358/136; 358/105
[58] Field of Search ............ 358/133, 135, 136, 105; H04N 7/137

[56] References Cited

U.S. PATENT DOCUMENTS

| | | | |
|---|---|---|---|
| 4,674,125 | 6/1987 | Carlson et al. | 382/49 |
| 4,703,514 | 10/1987 | van der Wal | 382/41 |
| 4,853,779 | 8/1989 | Hammer et al. | 358/133 |
| 4,864,394 | 9/1989 | Gillard | 358/105 |
| 4,965,666 | 10/1990 | Haghiri | 358/105 |
| 4,980,764 | 12/1990 | Henot | 358/133 |

OTHER PUBLICATIONS

C. Bergeron, E. Dubois, "Gradient Based Algorithms For Block Oriented MAP Estimation of Motion and Application to Motion-Compensated Temporal Interpolation", IEEE Trans. On Circuits And Systems For Video Technology, vol. 1, No. 1, Mar. 1991, pp. 72–85.

K. Metin Uz et al., "Interpolative Multiresolution Coding of Advanced Television with Compatible Subchannels", IEEE Trans. On Circuits And Systems For Video Technology, vol. 1, No. 1, Mar. 1991, pp. 86–98.

*Primary Examiner*—Howard W. Britton
*Attorney, Agent, or Firm*—Joseph S. Tripoli; Eric P. Herrmann; Ronald H. Kurdyla

[57] ABSTRACT

First circuit apparatus, comprising a given number of prior-art image-pyramid stages, together with second circuit apparatus, comprising the same given number of novel motion-vector stages, perform cost-effective hierarchical motion analysis (HMA) in real time, with minimum system processing delay and/or employing minimum hardware structure. Specifically, the first and second circuit apparatus, in response to relatively high-resolution image data from an ongoing input series of successive given pixel-density image-data frames that occur at a relatively high frame rate (e.g., 30 frames per second), derives, after a certain processing-system delay, an ongoing output series of successive given pixel-density vector-data frames that occur at the same given frame rate. Each vector-data frame is indicative of image motion occurring between each pair of successive image frames.

19 Claims, 11 Drawing Sheets

PRIOR ART

2-PORT
CONFIGURATION OF
3-PORT
FEEDBACK BUFFER

FIGURE 4c

1-PORT
CONFIGURATION OF
3-PORT
FEEDBACK BUFFER

IMPLEMENTATION ARCHITECTURE FOR PERFORMING HIERARCHICAL MOTION ANALYSIS OF VIDEO IMAGES IN REAL TIME

BACKGROUND OF THE INVENTION

Analysis of image motion occurring in a series of successive video frames is traditionally a computationally expensive algorithm, with no practical hardware implementations for real time performance. Recent computer software techniques using hierarchical motion analysis (HMA) algorithms have made the computations significantly more efficient. However, it is still not practical, employing these computer software techniques, to perform cost-effective HMA in real time at the relatively high frame rate (e.g., 30 frames per second) on an ongoing series of successive video images.

Traditional motion analysis, which is performed only on the full 2-dimensional image pixel resolution, requires $C*(N^2*M^2*K)$ operations, where C is a constant, $N^2$ is the image size in pixels at the full 2-dimensional image pixel resolution, $M^2$ is the maximum expected motion distance in pixels at the full 2-dimensional image pixel resolution, and K is the number of computation operations required for a motion estimate with M equal to 1 pixel. HMA, as now practiced, is performed by computer software algorithms operating on each level of a multiresolution representation of the image in a coarse to fine manner, starting with the lowest resolution. The result of the motion analysis at each level is used as an initial estimate in the next higher resolution level. The motion vectors generated by the motion analysis on the highest resolution level are the final motion vector estimates. The maximum expected motion for the analysis at each level is 1 ($\pm 1$ pixel), while the total maximum motion can be $2^n$, where $n+1$ is the number of resolution levels of the multiresolution representation. The total required computational operations at all resolution levels, regardless of the number of resolution levels, is now reduced to no more than $4/3*C*(N^2*K)$.

An additional advantage of HMA is that local coherent motion is performed more robustly, resulting in a higher confidence in the correctness of the motion estimate.

SUMMARY OF THE INVENTION

The present invention is directed to hardware architecture for the practical implementation of HMA in real time, thereby making HMA cost effective for studio type applications employing digital television equipment. Applications for such digital television equipment include frame rate conversion, scan conversion, noise cleaning, and image compression.

More specifically, the present invention relates to an image-processing system comprising first and second hardware means, which system, in response to relatively high-resolution image data from an ongoing input series of successive given pixel-density image-data frames that occur at a given frame rate, derives, after a certain processing-system delay, an ongoing output series of successive given pixel-density vector-data frames that occur at the same given frame rate. Each vector-data frame is indicative of image motion occurring between each pair of successive image frames.

The first hardware means is used to represent the image data of each single one of the image-frames at $n+1$ ordinally-arranged successively lower pixel-density levels 0 ... n within a first time interval equal in length to a given fraction of the certain processing-system delay, where n is a given integer having a value of at least 1. The pixel-density of level 0 corresponds to the given pixel density and the pixel-density of level n corresponds to a lowest pixel density. Further, the maximum expected image motion occurring between two successive frames is typically no greater than one pixel distance at the lowest pixel-density. The second hardware means, which incorporates at least one image buffer means, at least one warp means, at least one motion-analysis means, at least one pixel-density expand means, and at least one adder means, sequentially employs the image data at the pixel-density levels n ... 0 to derive, within a second time interval equal in length to a remaining fraction of the certain processing-system delay, a separate motion vector for each pixel at each of the pixel-density levels, starting with the lowest pixel-density n, for that pair of successive image-frames.

The result is that a high-resolution motion-vector map at the given pixel-density may be derived in real time in response to each pair of successive given pixel-density image-frames of the ongoing input series.

DESCRIPTION OF THE PREFERRED EMBODIMENTS

Figure 1:
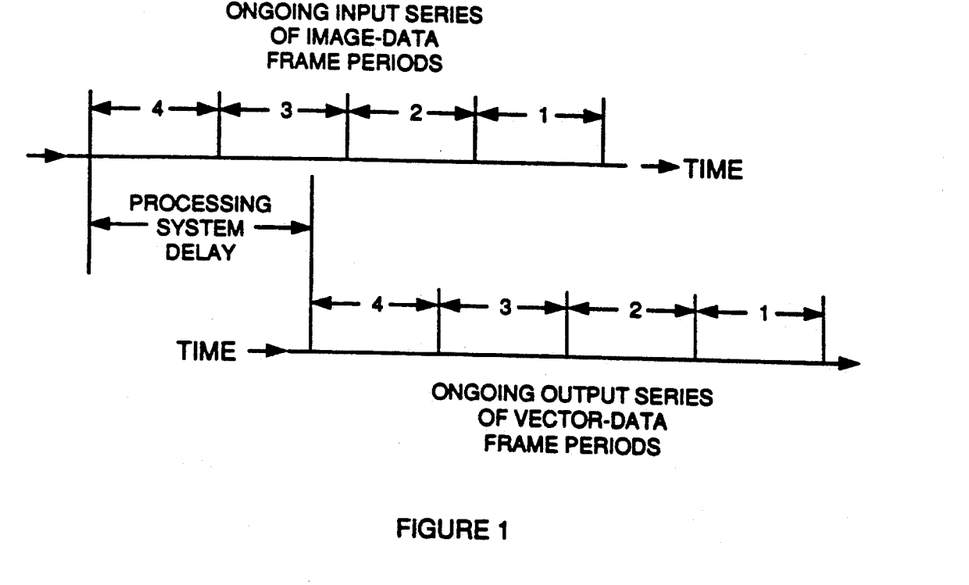
FIG. 1 is a timing diagram showing the relationship between an ongoing output series of vector-data frame periods and an ongoing input series of image-data frame periods as a function of processing system delay.

The present invention is concerned with the "real-time" processing of an ongoing series of successive image-data frames that are applied as an input to an image-processing system for deriving as an output an ongoing series of successive vector-data frames. Since it inherently takes time to process image data, there will always be a delay between the processed data output from the system and the data input to the system. As used herein, the term "real-time" means that the successive output frames emerge from the image-processing system at the same rate that the successive input frames are applied thereto, as illustrated in FIG. 1, despite the existence of a processing system delay between the occurrence of corresponding output and input frames. Thus, as shown, by way of example in FIG. 1, a given set of four consecutive frame periods 1, 2, 3 and 4 of an ongoing input series of image-data frame periods applied to an image processing system at a given rate, emerges, after a certain system processing delay, as a corresponding set of four consecutive frame periods 1, 2, 3 and 4 of an ongoing output series of vector-data frame periods that occurs at the same given rate. Therefore, while the system processing delay may be longer than a frame period (as shown in FIG. 1) or shorter, the length of each frame period of the ongoing output series of vector-data frame periods is equal to the length of each frame period of the ongoing input series of image-data frame periods.

Figure 2A:
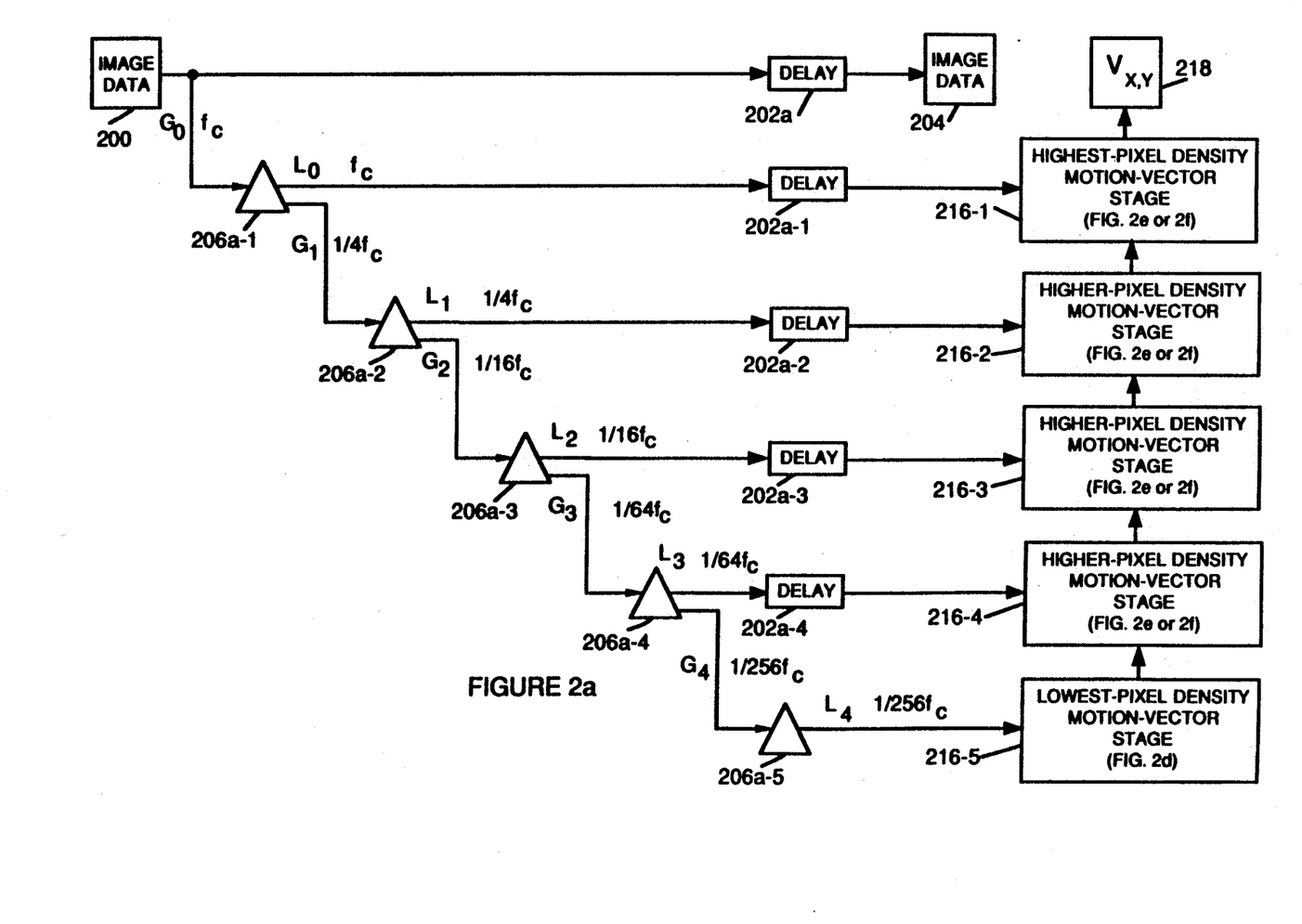
FIGS. 2a and 2b, respectively, diagrammatically illustrate Laplacian and Gaussian pyramid embodiments of the present invention that provide minimum processing system delay.
Figure 2B:
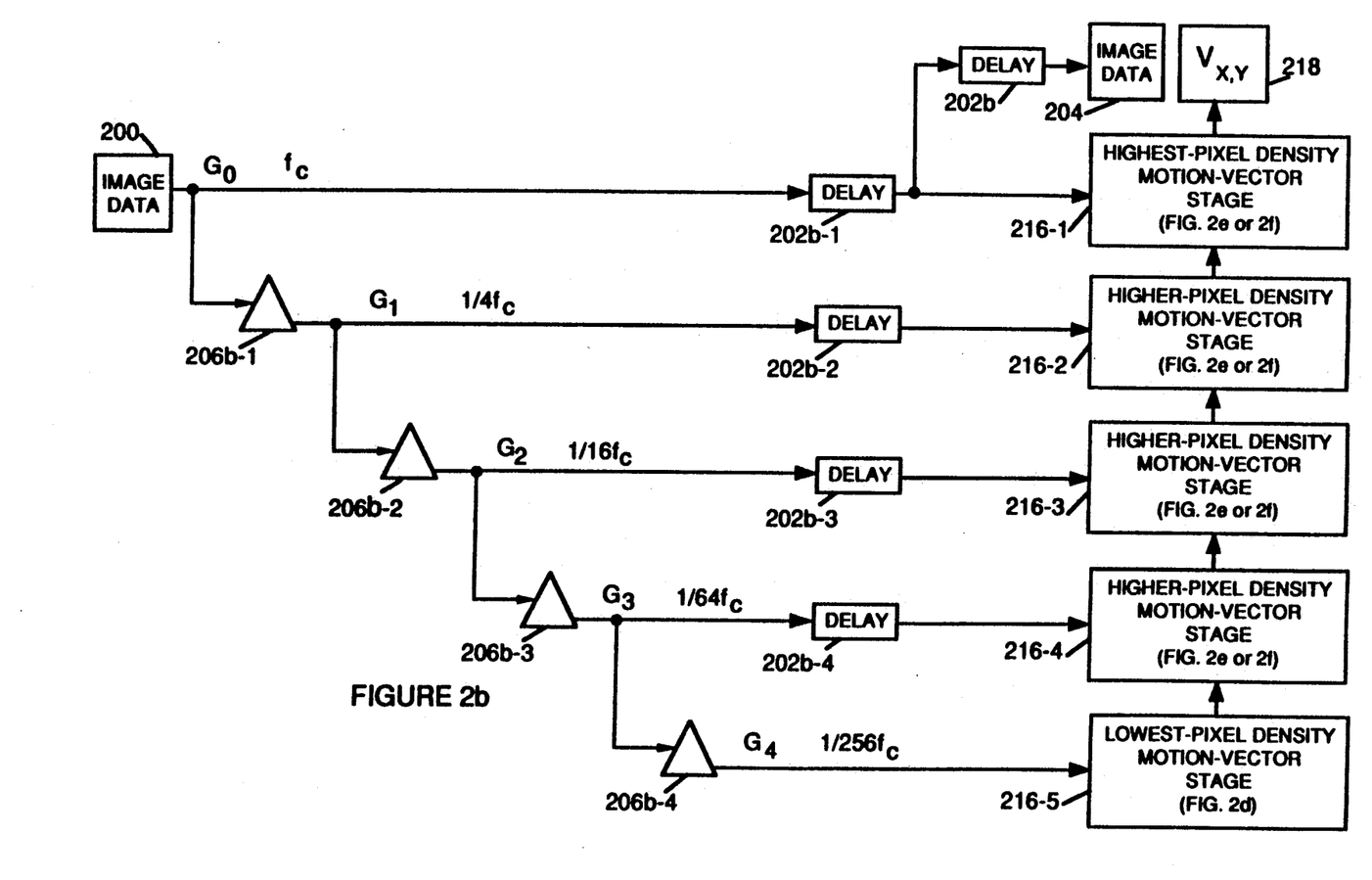

Reference is now made to the FIG. 2a embodiment (making use of Laplacian pyramid stages) and the FIG. 2b embodiment (making use of Gaussian pyramid stages) of the present invention, which embodiments, although requiring a relatively large amount of hardware in their implementation, provide minimum system processing delay. As shown in FIGS. 2a and 2b, the output from image data means 200 comprises, in digital form, an ongoing stream of image-data pixels of each of successive 2-dimensional video frames. The relatively high pixel density of the Gaussian output $G_0$ of each successive video frame of the image-data output from means 200 occurs at a clock $CL_0$ having a frequency $f_c$.

In the case of FIG. 2a, the output $G_0$ is applied (1) directly through delay means 202a to image means 204 and (2) in cascade through each of Laplacian image-pyramid stages 206a-1 . . . 206a-5. For a detailed description of a Laplacian image-pyramid, reference should be made to U.S. Pat. No. 4,674,125, which issued to Carlson et al. on Jun. 16, 1987.

Figure 2C:
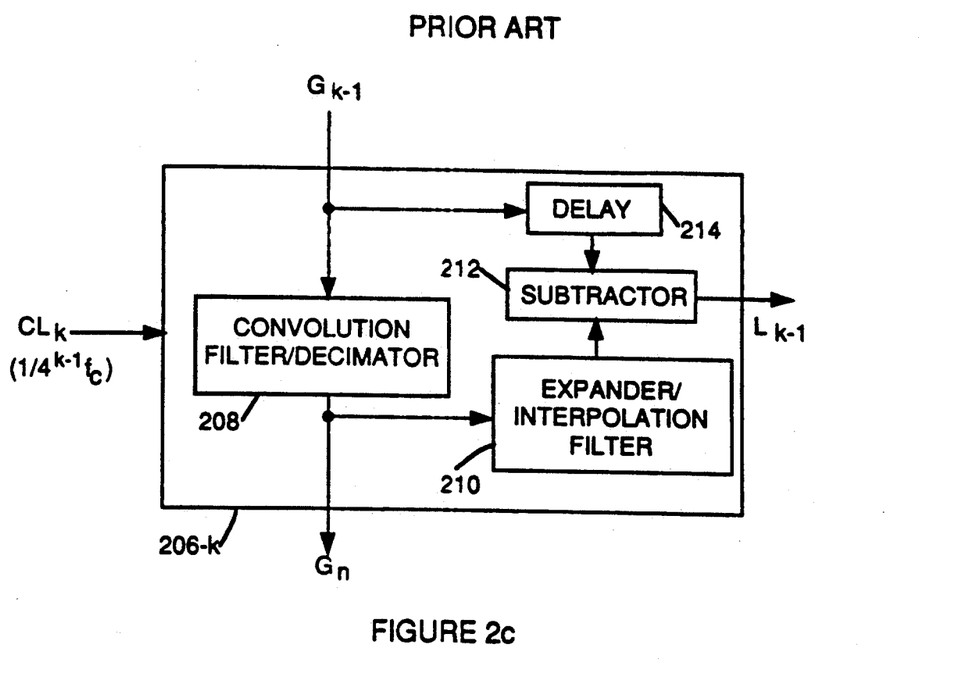
FIG. 2c diagrammatically illustrates the structure of a prior-art Laplacian image pyramid stage employed by the FIG. 2a embodiment.

Specifically, as diagrammatically shown in FIG. 2c, the structure of a Laplacian image-pyramid stage 206-k, operating with a clock $CL_k$ having a frequency equal to $\frac{1}{4}^{k-1}f_c$, comprises 2-dimensional convolution filter/decimator 208, expander/interpolation filter 210, subtractor 212 and delay means 214. Convolution filter/decimator 208, which may include a rate buffer for deriving equispaced output pixels, reduces both the horizontal image pixel density and the vertical image pixel density by one-half, so that the pixel image density of a Gaussian image output $G_k$ from stage 206-k is only one-quarter of the image pixel density of the Gaussian input $G_{k-1}$ thereto. A Laplacian image output $L_{k-1}$ from stage 206-k (having the image pixel density of $G_{k-1}$) is derived by subtracting each image pixel output from expander/interpolation filter 210 from the corresponding image pixel input $G_{k-1}$, after delay by delay means 214.

Returning to FIG. 2a, it is plain that the image pixel density of $G_4$ and of $L_4$ is only 1/256 of the high image pixel density $G_0$ of the original image data (i.e., each of the horizontal and vertical image distances covered by each lowest-density $G_4$ pixel or $L_4$ pixel is 8 times larger than the horizontal and vertical image distances covered by each highest-density $G_0$ pixel). For illustrative purposes, it is assumed that the maximum image motion that can occur between two successive image frames is no greater than one lowest-density image pixel distance in the horizontal direction or in the vertical direction.

Figure 2D:
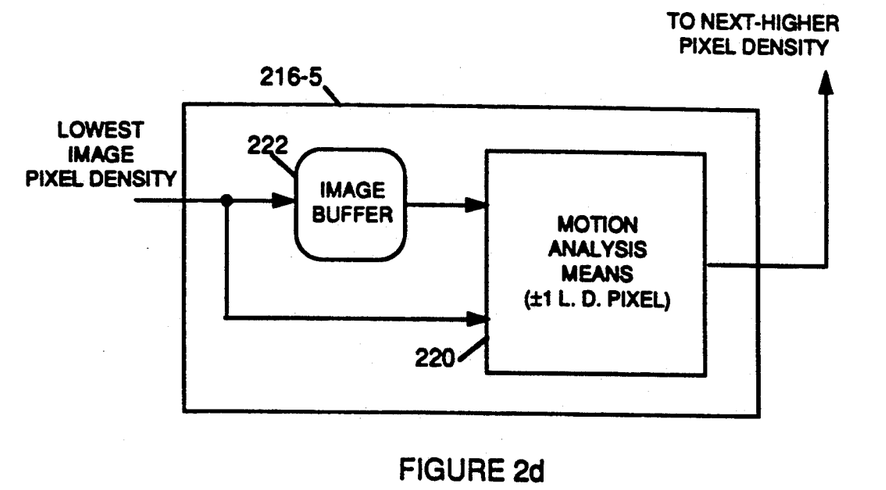
FIG. 2d diagrammatically illustrates the structure of the lowest-pixel-density motion-vector stage employed by both the FIGS. 2a and 2b embodiments.
Figure 2E:
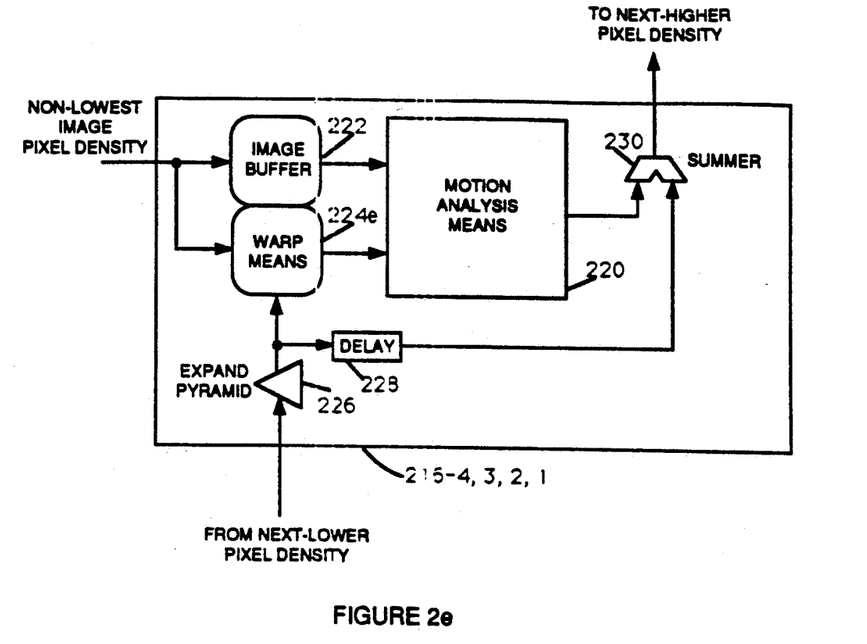
FIGS. 2e and 2f diagrammatically illustrate alternative structure of each higher-pixel-density motion-vector stage employed by both the FIGS. 2a and 2b embodiments.

As shown in FIG. 2a, the respective Laplacian image outputs $L_0$ . . . $L_3$ from stages 206a-1 . . . 206a-4, after suitable delays by delay means 202a-1 . . . 202a-4, are applied respectively to motion-vector stages 216-1 . . . 216-4, while the Laplacian image output $L_4$ from stage 206a-5, with no delay, is applied to motion-vector stage 216-5. Motion-vector stage 216-5 may be implemented as shown in FIG. 2d, while each of motion-vector stages 216-1 . . . 216-4 may be implemented as shown in FIG. 2e or, alternatively, FIG. 2f. The respective outputs of motion-vector stages 216-5 . . . 216-2 are cascaded upward to motion-vector stage 216-1 and the motion-vector output from motion-vector stage 216-1 is applied to $V_{x,y}$ means 218.

Figure 3:
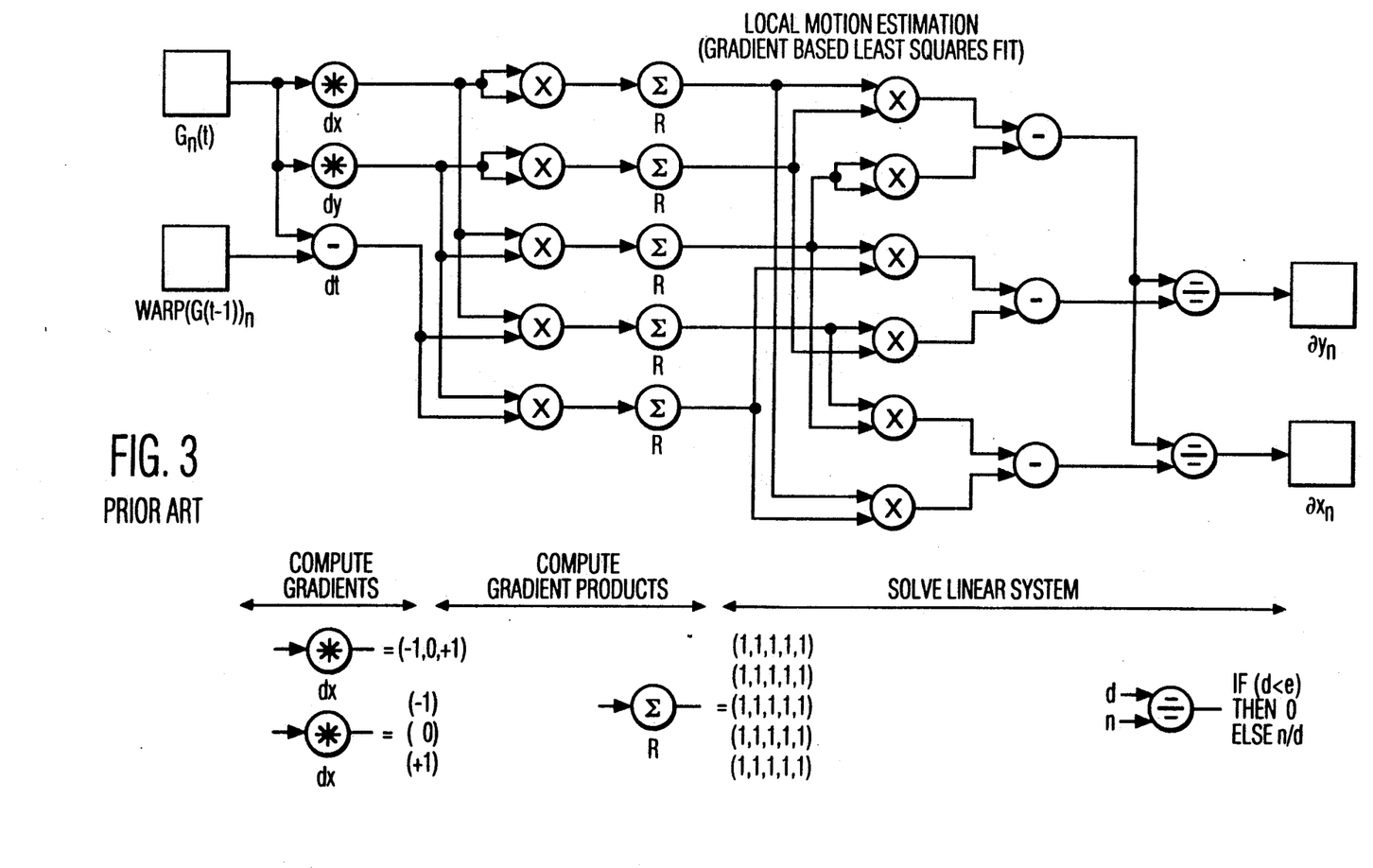
FIG. 3 schematically illustrates the computations performed by one example of a prior-art motion analysis means.

Specifically, as shown in FIG. 2d, the lowest image pixel density (i.e., the Laplacian image output $L_4$ from stage 206a-5 in the case of FIG. 2a), is applied as a first input to motion analysis means 220 and as an input to image buffer 222, and the output from image buffer 222 is applied as a second input to motion analysis means 220. Image buffer 222 stores the values of all of the $L_4$ pixels of the preceding image frame for one frame period and then forwards these pixels to motion analysis means 220 concurrently with the application thereto of the corresponding pixels of the current image frame. Motion analysis means 220, which makes an independent best estimate of pixel motion $V_x$ and $V_y$ of each individual pixel in the horizontal (X) and in the vertical (Y) directions and are typically in the range between ±1 pixel distance in the X and Y directions, makes use of known correlation, least-square best-fit or other techniques. For illustrative purposes, FIG. 3 shows one known example of the computations required to implement motion analysis means 220 using least-square best-fit techniques.

The output of motion analysis means 220 of lowest-pixel density motion-vector stage 216-5, shown in FIG. 2d, is applied as an input to higher-pixel density motion-vector stage 216-4. Motion-vector stage 216-4, as well as each of motion-vector stages 216-3, 216-2 and 216-1, may be implemented either in the manner shown in FIG. 2e or in FIG. 2f. The structure of FIG. 2e, like the structure of FIG. 2d, includes motion analysis means 220 and image buffer 222, and, in addition, includes warp means 224e, expand-pyramid means 226, delay means 228 and summer 230. Except for replacing warp means 224e with warp means 224f, the structure of FIG. 2f is the same as that of the structure of FIG. 2e.

In FIG. 2e, the non-lowest image pixel density (i.e., the Laplacian image output $L_3$, $L_2$, $L_1$ or $L_0$ from stage 206a-4, 206a-3, 206a-2, 206a-1 or 206a-0, respectively, in the case of FIG. 2a) is applied as a signal input to both warp means 224e and image buffer 222, and the respective outputs from warp means 224e and image buffer 222 are applied as first and second inputs to motion analysis means 220. The output from motion analysis means 220 is applied as a first input to summer 230. The $V_x$ and $V_y$ motion vector outputs derived by the next-lower pixel density motion-vector state 216-5, 216-4, 216-3 or 216-2, respectively, is applied as an input to expand-pyramid means 226 of motion-vector stage 216-4, 216-3, 216-2 or 216-1, respectively. Expand-pyramid means 226 is effective in doubling the pixel density of each of the $V_x$ and each of the $V_y$ motion vectors, while at the same time doubling the value of each of these motion vectors (since a single pixel distance at the next-lower pixel density of each of the $V_x$ and each of the $V_y$ motion vectors is equal to 2 pixel distances at the expanded pixel density of each of the $V_x$ and each of the $V_y$ motion vectors). The expanded $V_x$ and $V_y$ motion vectors at the output of expand-pyramid means 226 are applied as a control input to warp means 224e and through delay means 228 as a second input to summer 230. Warp means 224e is effective in displacing backward each individual image pixel of the current image frame applied thereto toward the corresponding image pixel of the stored preceding image frame, then at the output of image buffer 222, by its corresponding $V_x$ image-pixel distance in the horizontal direction and by its corresponding $V_y$ image-pixel distance in the vertical direction. Therefore, the motion analysis means 220 of FIG. 2e need only make a best estimate of residual motion that has taken place of each corresponding image pixel between the current image frame and the preceding image frame. The delay provided by delay means 228 ensures that the residual $V_x$ and $V_y$ motion vectors of each pixel applied to the first input of summer 230 occur concurrently with the expanded $V_x$ and $V_y$ motion vectors of each corresponding pixel derived from the next-lower pixel density motion-vector stage 216-5, 216-4, 216-3 or 216-2, respectively. In this manner, the $V_x$ and $V_y$ motion vectors for each pixel at the output of summer 230 of each subsequent higher pixel density one of motion-vector stages 216-4, 216-3 216-2 and 216-1 define the $V_x$ and $V_y$ motion vectors of each pixel with greater and greater precision, so that the 2-dimensional estimate of the motion vector for each pixel at the output of summer 230 of highest-pixel density motion-vector stage 216-1, which is applied to $V_{x,y}$ means 218, is 256 times more precise than the 2-dimensional estimate of the motion vector for each pixel at the output of summer 230 of lowest-pixel density motion-vector stage 216-5.

Figure 2F:
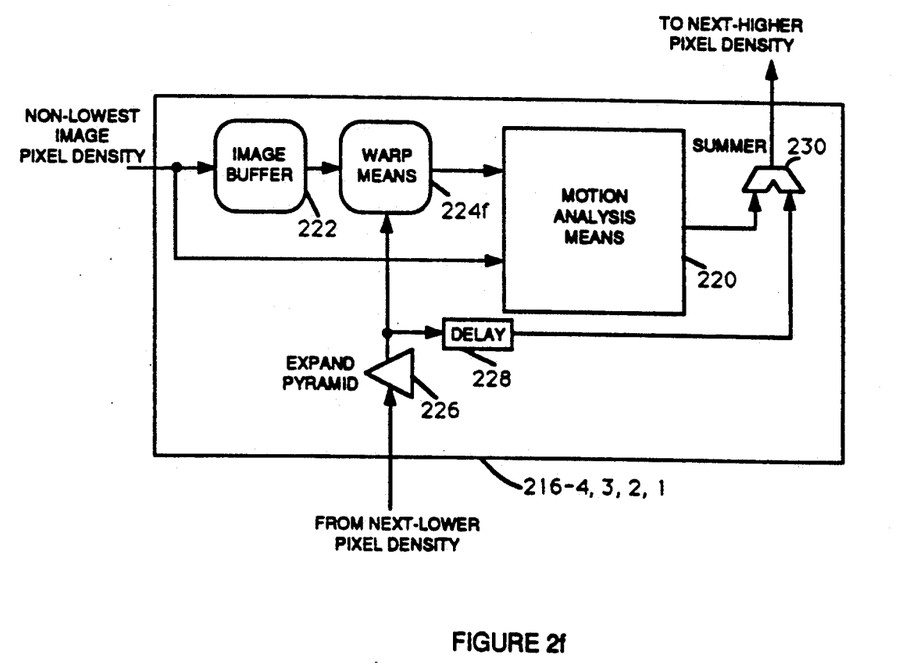

In FIG. 2f, the non-lowest image pixel density (i.e., the Laplacian image output $L_3$, $L_2$, $L_1$ or $L_0$ from stage 206a-4, 206a-3, 206a-2, 206a-1 or 206a-0, respectively, in the case of FIG. 2a) is applied directly as a first input to motion analysis means 220 and as an input to image buffer 222, with the output from image buffer 222 being applied as a signal input to warp means 224f, and the output from wrap means 224f being applied as a second input to motion analysis means 220. Warp means 224f is effective in displacing forward each individual image pixel, applied thereto, of the stored preceding image frame then at the output of image buffer 222, toward the corresponding image pixel of the current image frame by its corresponding $V_x$ image-pixel distances in the horizontal direction and by its corresponding $V_y$ image-pixel distances in the vertical direction. In all other respects FIG. 2f is identical in structure and function to that of above-described FIG. 2e.

Referring now to FIG. 2b, the output $G_0$ is applied (1) through serially-connected delay means 202b-1 and 202b to image means 204, (2) solely through delay means 202b-1 as the image signal input to motion-vector stage 216-1 and (3) in cascade through each of Gaussian image-pyramid stages 206b-1 . . . 206b-4. The structure of each of Gaussian image-pyramid stages 206b-2 . . . 206b-5 comprises solely 2-dimensional convolution filter/decimator 208c, with the respective $G_1$ . . . $G_4$ outputs of Gaussian image-pyramid stages 206b-1 . . . 206b-4 of FIG. 2b replacing the respective $L_1$ . . . $L_4$ outputs of Laplacian image-pyramid stages 206a-1 . . . 206a-4 of FIG. 2a.

From the point of view of deriving 2-dimensional motion vectors in real time, the Gaussian image-pyramid of FIG. 2b and the Laplacian image-pyramid of FIG. 2a are, for the most part, equivalent. However, because any change in image brightness level between any two successive $G_0$ video image frames from image data means 200 tends to adversely affect the Gaussian image-pyramid derivation of motion vectors somewhat more than the Laplacian image-pyramid derivation of motion vectors, the Laplacian image-pyramid of FIG. 2a is to be preferred.

It is apparent that there is a first inherent system processing delay in traversing down the cascaded stages of either the Gaussian or Laplacian image-pyramid and an additional inherent system processing delay in traversing up the cascaded motion-vector stages. The value of the delay provided by each of the respective delay means 202 of FIG. 2a or FIG. 2b is set to compensate for these inherent system processing delays and thereby ensure timing concurrence in all cases between interacting corresponding image and motion-vector pixels that have traveled to each of the motion-vector stages over different paths.

The minimum total system processing delay of the Gaussian FIG. 2b embodiment of the present invention is slightly less than that of the Laplacian FIG. 2a embodiment of the present invention. Specifically, with an NTSC scan-line period of 63.5 $\mu$s (including blanking time), the minimum realizable total system processing delay of the Gaussian FIG. 2b embodiment (with $G_4$ being the lowest pixel density) is 144.3 scan-line periods, while the minimum realizable total system processing delay of the Laplacian FIG. 2a embodiment is increased by 35 scan-line periods to 178.3 scan-line periods. The delay in scan-line periods provided by each of delay means 202b-1 . . . 202b-4 is determined by the differential system processing delay between its two end points, divided by the reduction in the clock frequency $f_c$ at that pyramid level. For instance, the delay provided by delay means 202b-2 is 132.23/4 scan-line periods.

The problem with both the FIG. 2a and FIG. 2b embodiments of the present invention is they require a large amount of hardware to implement. In particular, each of the FIG. 2a and FIG. 2b embodiments requires five separate motion-vector stages, each of which includes its own rather complex and costly motion analysis means in order to achieve a relatively small minimum realizable total system processing delay for only five pyramid levels. Reference is now made to the FIG. 4 embodiment of the present invention which requires only two separate motion-vector stages, regardless of how many pyramid levels are involved.

Figure 4:
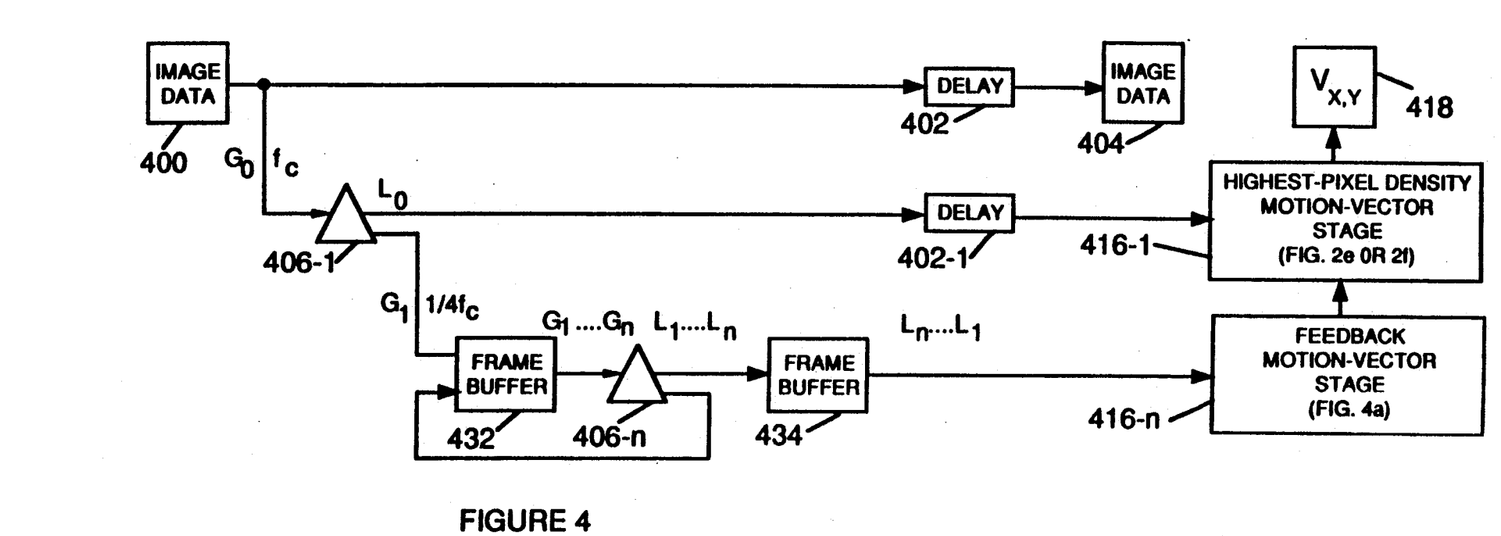
FIG. 4 diagrammatically illustrates a feedback Laplacian pyramid embodiment of the present invention that employs reduced system hardware at the expense of increased processing system delay.
Figure 4A:
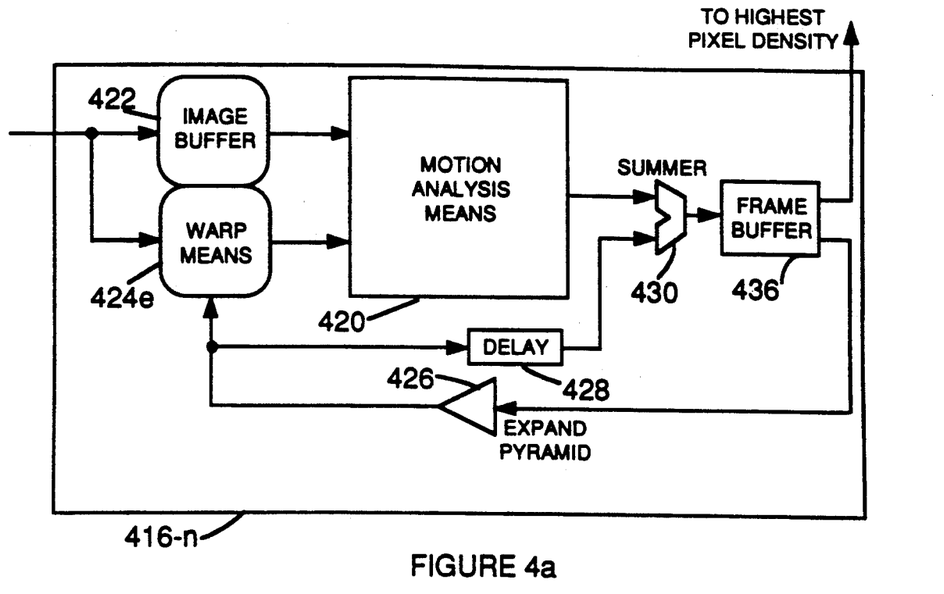
FIG. 4a diagrammatically illustrates the structure of the feedback motion-vector stage employed by the FIG. 4 embodiment.

For illustrative purposes, the FIG. 4 embodiment employs a Laplacian image pyramid, but could, if desired, employ a Gaussian image pyramid instead. Specifically, image data means 400, delay means 402, image data means 404, Laplacian image pyramid stage 406-1, delay means 402-1, motion-vector stage 416-1 and $V_{x,y}$ means 418 of FIG. 4 are identical in structure and function to image data means 200, delay means 202a, image data means 204, Laplacian image pyramid stage 206a-1, delay means 202a-1, motion-vector stage 216-1 and $V_{x,y}$ means 218 of FIG. 2a. However, in FIG. 4, the $G_1$ output of Laplacian image pyramid stage 406-1 is applied as a first input to functionally 3-port frame buffer 432. The output from frame buffer 432 is applied as an input to Laplacian image pyramid stage 406-n (comprising structure shown in FIG. 2c), with the Laplacian output therefrom being applied as an input to frame buffer 434 and the Gaussian output therefrom being fed back as a second input to frame buffer 432. The output from frame buffer 434 is applied as an input to feedback motion-vector stage 416-n, which may be implemented as shown in FIG. 4a discussed below. Motion-vector stage 416-n derives as an output $V_x$ and $V_y$ motion vectors at the $G_1$ pixel-density level, which are applied as a warp-control input to motion-vector stage 416-1.

Figure 4B:
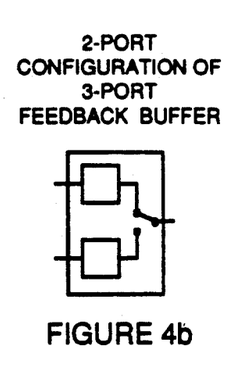
FIGS. 4b and 4c, respectively, diagrammatically illustrate two different alternative structures for the 3-port frame buffer employed by the FIG. 4 embodiment.
Figure 4C:
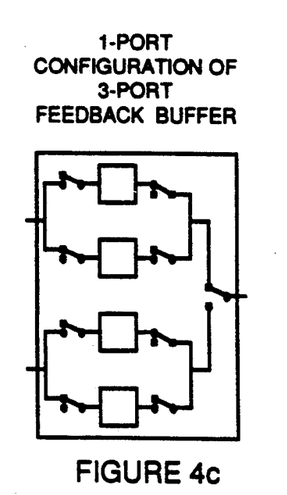

Structurally, frame buffer 432 may comprise a single 3-port frame memory having two independent input ports and a single output port, or, alternatively, may comprise either two 2-port frame memories capable of having one of their two output ports selected by a switch, as shown in FIG. 4b, or four 1-port frame memories each having its one port either unselected or selected as an input or as an output port by a group of switches, as shown in FIG. 4c. In any event, as indicated in FIG. 4, the readout from frame buffer 432 of the stored $G_1$ pixels of each video frame results in stage 406n deriving a Laplacian output $L_1$ and a Gaussian output $G_2$. The Gaussian output $G_2$, which is fed back as an input to frame buffer 432, stored therein and then read out therefrom as an input to stage 406n, results in stage 406n deriving a Laplacian output $L_2$ and a Gaussian output $G_3$. This recycling process continues until stage 406n derives a Laplacian output $L_n$ and a Gaussian output $G_{n+1}$ (where n may have as high an integral value as desired), which Gaussian output $G_{n+1}$ is not recycled through frame buffer 432. Because the pixel density of $G_1$ is only $\frac{1}{4}$ of that of $G_0$ and because of the reduction by decimation in pixel density by a factor of 4 during each feedback cycle, the total number of $G_1 \ldots G_n$ pixels of each video frame can never be greater than $\frac{1}{3}$ of the number of $G_0$ pixels of that video frame. Thus, while the required storage capacity of each of frame buffers 420 and 422 is not large, their presence does insert additional system processing delay in the FIG. 4 embodiment. The use of feedback recycling to reduce the hardware required to implement a Laplacian image pyramid is described in more detail in U.S. Pat. No. 4,703,514, which issued to me on Oct. 27, 1987.

As indicated in FIG. 4, while the Laplacian output from image pyramid stage 406-n is applied to the input of frame buffer 434 in the sequential order $L_1 \ldots L_n$, the output from frame buffer 434 is applied to the input of motion-vector stage 416-n in the sequential order $L_n \ldots L_1$. As shown in FIG. 4a, feedback motion-vector stage 416-n may comprise motion analysis means 420, image buffer 422 and warp means 424e (which are interconnected in a manner similar to that shown in FIG. 2e and are responsive to each of the $L_n \ldots L_2$ output from frame buffer 434 being applied in sequential order as an input to feedback motion-vector stage 416-n). Feedback motion-vector stage 416-n may also comprise expand-pyramid stage 426, delay means 428, summer 430 and dual-port frame buffer 436. The output from motion analysis means 420 is applied as a first input to summer 430 and the output from summer 430 is applied as an input to frame buffer 436. The output from frame buffer 436 is fed back through expand-pyramid stage 426 and applied both as a warp control input to warp means 424e and through delay means 428 as a second input to summer 430 in response to each of the $L_n \ldots L_2$ output from frame buffer 434 being applied in order as an input to feedback motion-vector stage 416-n, but the output from frame buffer 436 is applied as an input to highest pixel density motion-vector stage 416-1 in response to the $L_1$ output from frame buffer 434 being applied in sequential order as an input to feedback motion-vector stage 416-n.

It is obvious that a warp means, connected as is warp means 224f in FIG. 2f, can be substituted in FIG. 4a for warp means 424e.

Figure 5:
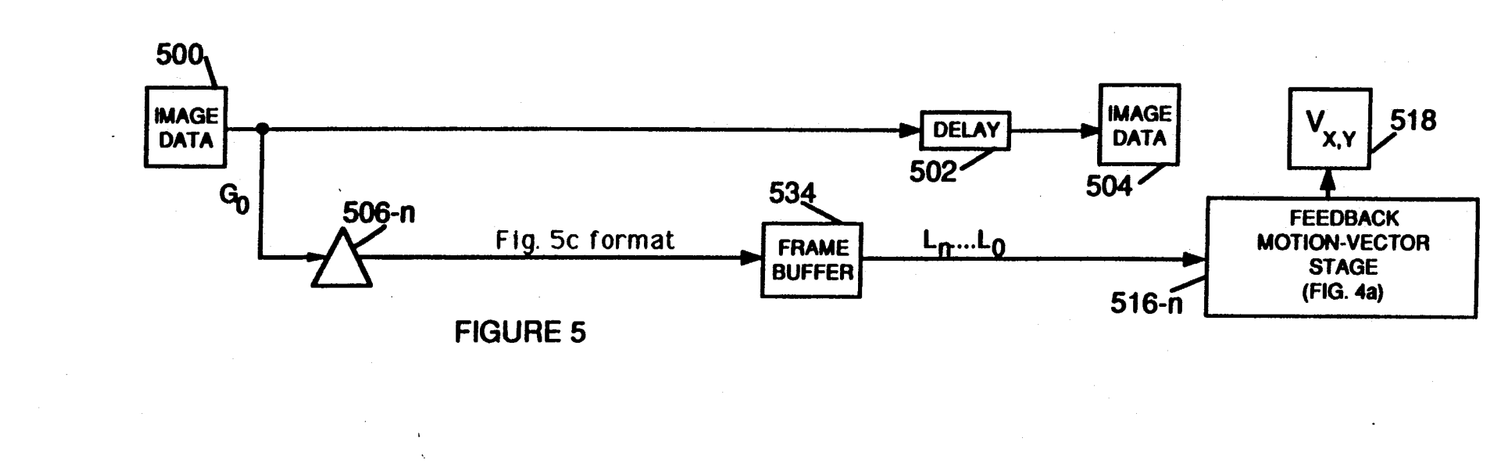
FIG. 5 diagrammatically illustrates a feedback Laplacian pyramid embodiment of the present invention that employs a single pyramid stage to achieve minimum system hardware, while providing a higher output clock frequency to achieve minimum processing system delay.

Reference is now made to the FIG. 5 embodiment of the present invention which requires only a single motion-vector stage, regardless of how many pyramid levels are involved. Further, the FIG. 5 embodiment need not insert additional system processing delay, as is the case in the FIG. 4 embodiment. This is accomplished by employing a single image pyramid stage 506-n, having the structure shown in FIG. 5a discussed below, to derive, at an increased clock frequency and in a novel scan-line order, each of Laplacian outputs $L_0 \ldots L_n$ applied as an input to frame buffer 534. Frame buffer 534 may then apply at this increased clock frequency each of its Laplacian outputs $L_0 \ldots L_n$ in a different predetermined order as an input to feedback motion-vector stage 516-n.(having the structure shown in FIG. 5d), and the output from feedback motion-vector stage 516-n is applied directly to $V_{x,y}$ means 518.

Figure 5A:
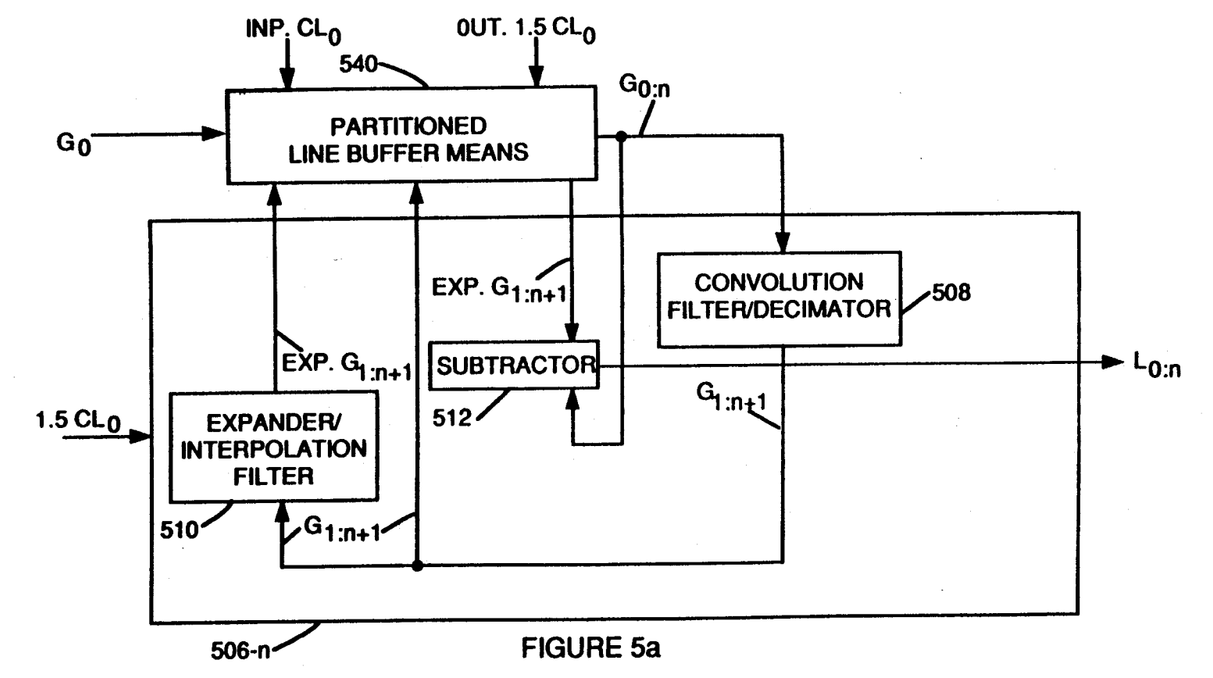
FIG. 5a diagrammatically illustrates the structure of the single pyramid stage employed by the FIG. 5 embodiment.
Figure 5B:
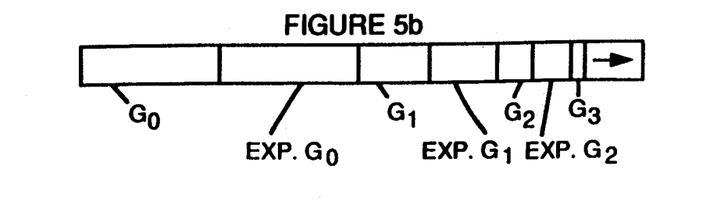
FIG. 5b diagrammatically illustrates the format of the image information stored by the partitioned line buffer means of the FIG. 5a pyramid stage.
Figure 5C:
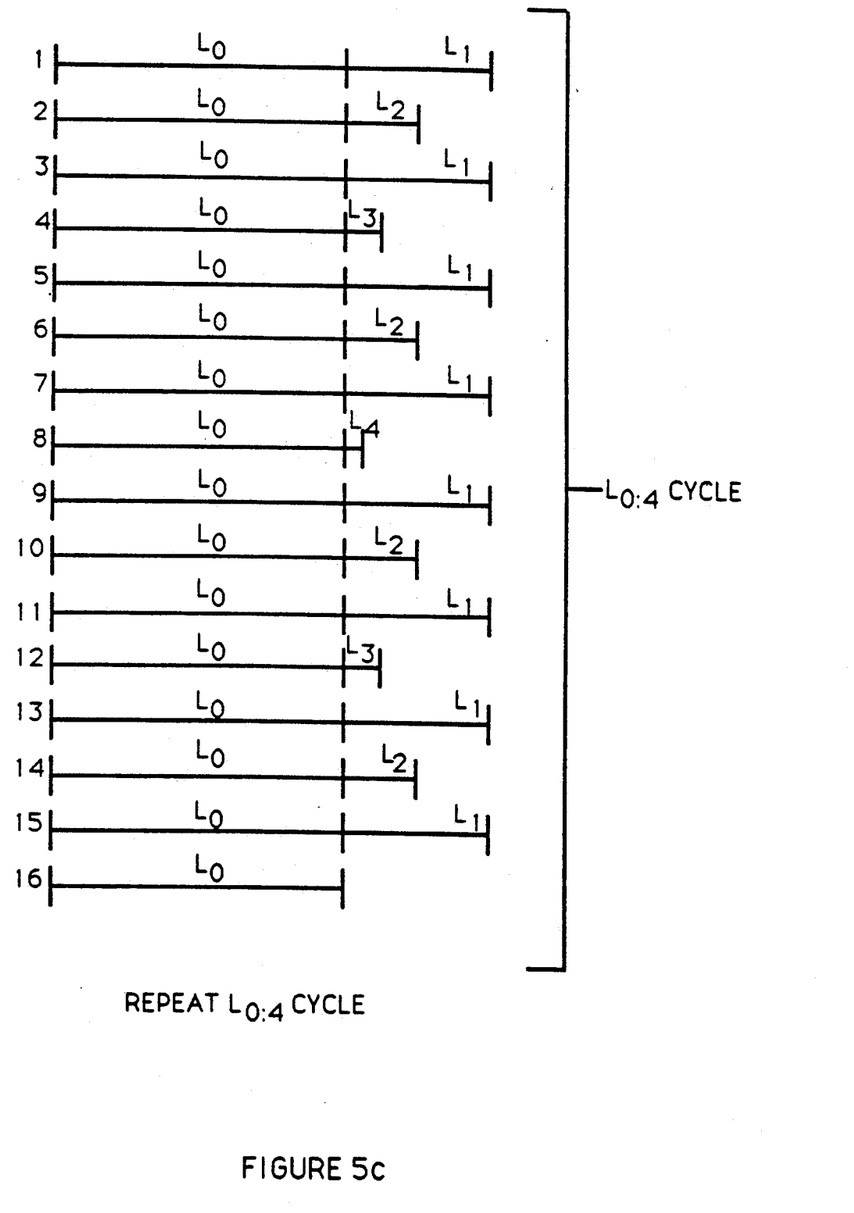
FIG. 5c is a timing diagram illustrating the Laplacian image output from the FIG. 5a pyramid stage.

The structure of image pyramid stage 506-n, shown in FIG. 5a, comprises convolution filter/decimator 508, expander/interpolation filter 510 and subtractor 512 (which correspond to convolution filter/decimator 208, expander/interpolation filter 210 and subtractor 212, of FIG. 2c), and partitioned line buffer means 540. A stream of Gaussian $G_0$ image data pixels, occurring at the $CL_0$ input clock frequency, is applied as an input to partitioned line buffer means 540, while the operating rate of the output from partitioned line buffer means 540 and of convolution filter/decimator 508, expander/interpolation filter 510 and subtractor 512 is at an increased clock frequency of 1.5 $CL_0$. As indicated in FIG. 5b, partitioned line buffer means 540 includes n+1 storage bins for separately storing each of $G_0 \ldots G_n$ pixels (e.g., $G_0$, $G_1$, $G_2$ and $G_3$). Each of these stored $G_0 \ldots G_n$ pixels (i.e., $G_{0:n}$). may be read out and applied as an input to convolution filter/decimator 508, which derives each of $G_{1:(n+1)}$ pixels. Each of $G_{(n+1)}$ pixels are applied as an input to expander/interpolation filter 510, with the output EXP $G_{1:(n+1)}$ (having the same respective pixel densities as $G_{0:n}$) from expander/interpolation filter 510 being separately stored in n+1 additional bins of partitioned line buffer means 540 (as shown in FIG. 5b). Subtractor 512 subtracts the values of EXP $G_{1:n}$ pixels read out (in the order shown in FIG. 5c) from partitioned line buffer means 540 from corresponding $G_{0:n}$ pixels also read out (in the order shown in FIG. 5c) from partitioned line buffer means 540, thereby deriving (in the order shown in FIG. 5c) the $L_{0:n}$ Laplacian output from image pyramid stage 506-n that is applied as an input to frame buffer 534. In particular, because of the increased clock frequency of 1.5 $CL_0$ at which the $L_{0:n}$ Laplacian output occurs, it is possible to derive in real time all the $L_0$ pixels in a scan-line, together with all the pixels in a scan-line of any one higher L image pyramid level, well within the same single video scan-line period of 63.5 μs, in the manner shown in FIG. 5c for the example in which $L_n=L_4$.

Figure 5D:
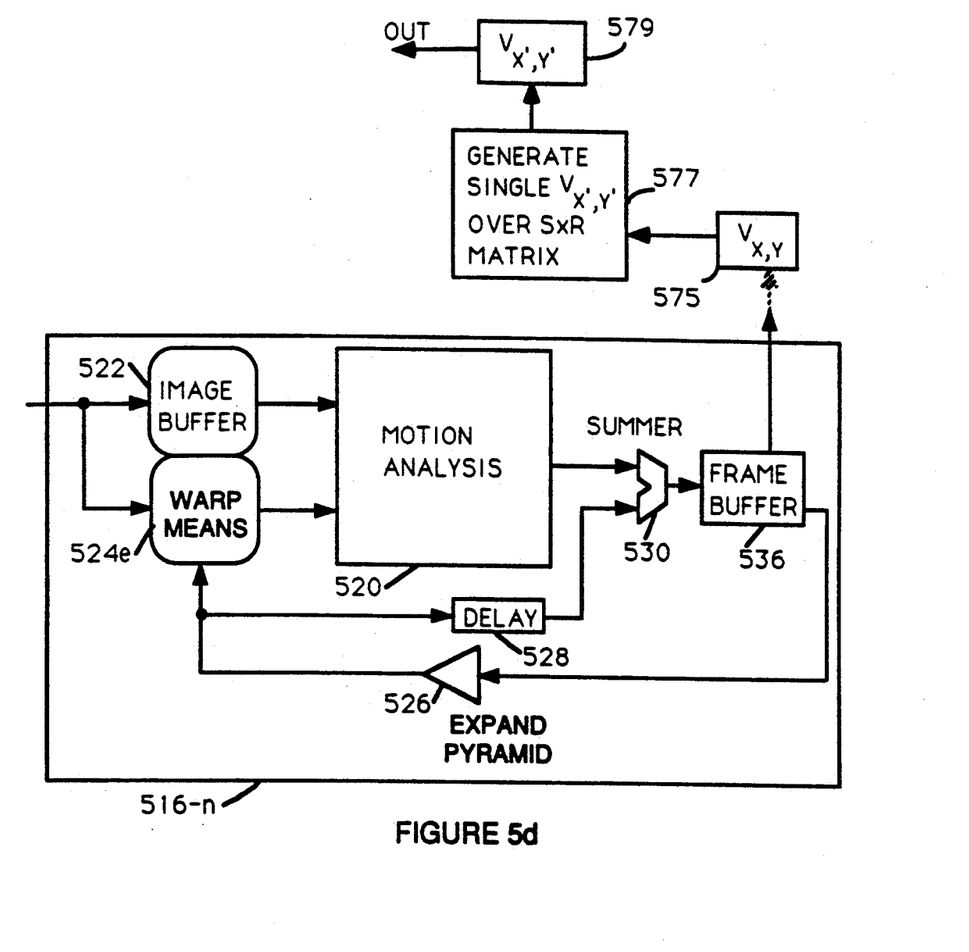
FIG. 5d diagrammatically illustrates the structure of the feedback motion vector stage employed by the FIG. 5 embodiment.

As shown in FIG. 5d, the structure of feedback motion-vector stage 516-n is the same as the structure of feedback motion-vector stage 416-n, shown in FIG. 4a. However, the order of the Laplacian output from frame buffer 534 applied as an input to FIG. 5d may be different from that of the input to FIG. 4a. More specifically, the Laplacian stored data from feedback motion-vector stage 416-n is applied to frame buffer 534, at the increased rate of 1.5 $CL_0$, either in a time sequential manner or, alternatively, in a time multiplexed manner.

In a time sequential manner, all of the $L_{0:n}$ Laplacian output data from FIG. 5a has to be first completely computed and stored in frame buffer 534 before frame buffer 534 can begin to apply this stored data to feedback motion-vector stage 416-n. This takes about one video frame period (including a vertical blanking time), resulting in the addition of an essentially one frame period delay to the system processing delay. Motion analysis by the FIG. 5d structure of feedback motion-vector stage 416-n to obtain the $V_{x,y}$ motion vectors at the highest pixel density of $L_0$ is performed in a manner similar to that of the FIG. 4a embodiment, resulting in an additional system processing delay of (1) ⅓ divided by 1.5 of a video frame period (where 1.5 corresponds to the increase in clock frequency) before the $V_{x,y}$ motion vectors at the highest pixel density of $L_0$ can be computed, plus (2) 1/1.5 of a video frame period for the highest pixel density of $L_0$.

In a time (i.e., scan-line) multiplexed manner, the FIG. 5d structural arrangement is modified to include a partitioned line buffer means similar to that shown in FIG. 5a instead of delay means 528. While the control of data flow and warp means is now more complex, the total system processing delay can be made similar to that of the FIG. 2a embodiment. Specifically, while the cumulative processing time of the sum of all n pixel-density levels taken together may exceed a video frame period, the processing time of each individual pixel-density level (including the longest $L_0$ pixel-density level) employing the 1.5 $CL_0$ clock frequency is substantially smaller than a video frame period. Therefore, the processing of consecutive pixel-density levels can be overlapping in processing time. Thus, while $L_n$ of a first-occurring video frame is still being processed, $L_0$ of a second-occurring video frame can already start its processing, and while the highest-pixel-density motion-vector values of a first-occurring video frame are still being computed, all of the lower-pixel-density motion-vector values of a second-occurring video frame may already have been computed.

It should be recognized that the pyramid stage 506-n of the filter/decimate-expand filter type may be replaced with a pyramid stage of the filter-subtract-decimate type to realize a more parts efficient embodiment. See U.S. Pat. No. 4,674,125 for an example of a filter-subtract-decimate module.

The described HMA implementations generate (typically) a motion vector for every pixel in the image. These are obtained by first computing motion vectors for a low resolution representation of the image (level n), where each vector $V_n$ has a subpixel resolution (relative to that image resolution) and represents a motion of $V_n*2n$ at the highest (full image resolution (level 0). These motion vectors $V_n$ are then refined at the next higher resolution level n−1, obtaining a (subpixel) motion vector $V_{n-1}$ for each pixel at resolution level n−1. This process is typically repeated until the motion vectors $V_o$ are computed at highest resolution (level 0).

Final motion vector representation, however, does not have to be at full resolution, buy may be at a lower resolution. For example one motion vector for each 16×16 block of image data (or resolution level 4) as is common for many compressed video signal formats, e.g., MPEG.

This motion vector can be obtained through HMA methods (implementations) by either a) computing the motion vectors from level n (n>4) to only level 4, and using this as the final motion vector result (at significant implementation cost savings, but reduced accuracy), or b) computing the motion vectors to a higher resolution (e.g., level 2 with a motion vector for every 4×4 pixel block) and then computing a more accurate motion vector for every 16×16 pixel block by combining (by some means) the higher resolution motion vectors, or c) computing the motion vectors to level 0 and averaging, e.g., 16×16 blocks of motion vectors to obtain high resolution motion vectors for the respective blocks. This apparatus is indicated in FIG. 5d wherein the box 575 is a memory buffer storing the level 0 motion vectors. An arithmetic unit 577 accesses 16×16 matrices of the level zero motion vectors and generates one vector for each matrix by taking the average, or the mean, or the median, etc., of the vectors included in each such matrix.

What is claimed is:

1. In an image-processing system, responsive to relatively high-resolution image data from an ongoing input series of successive given pixel-density image-frames that occur at a given frame rate, for deriving, after a certain processing-system delay, an ongoing output series of successive given pixel-density vector-data frames that occur at the same given frame rate, in which each vector-data frame is indicative of image motion occurring between each pair of successive image frames; wherein said system comprises first hardware means for representing the image data of each single one of said image-frames at n+1 ordinally-arranged successively lower pixel-density levels 0 . . . n within a first time interval equal in length to a given fraction of the certain processing-system delay, where n is a given integer having a value of at least 1, with pixel-density level 0 corresponding to said given pixel density and pixel-density level n corresponding to a lowest pixel density, and wherein said system further comprises:

second hardware means, incorporating at least one image buffer means, at least one image warp means, at least one motion-analysis means, at least one pixel-density expand means, and at least one adder means, for sequentially employing said image data of each pair of successive image-frames at each of said pixel-density levels n . . . n−k (k an integer less than or equal to n) to derive, within a second time.

interval equal in length to a remaining fraction of the certain processing-system delay, a separate motion vector for each pixel at each of said pixel-density levels n . . . n−k, starting with said lowest pixel-density n, for that pair of successive image-frames, by adding a residual motion vector for that pixel derived at each of said pixel-density levels above said lowest pixel-density n to the corresponding separate motion vector already derived at its immediately lower pixel-density level;

whereby a motion-vector map at n−k pixel-density may be derived in real time in response to each pair of successive given pixel-density image-frames of the ongoing input series.

2. The image-processing system defined in claim 1, wherein:

said second hardware means derives both a horizontal component $V_x$ and a vertical component $V_y$ of each separate motion vector for each pixel at each of said pixel-density levels.

3. The image-processing system defined in claim 1, wherein:

said first hardware means represents the image data of each single one of said image-frames at said n+1 ordinally-arranged successively lower pixel-density levels 0 . . . n in Gaussian format.

4. The image-processing system defined in claim 1, wherein:

said first hardware means represents the image data of each single one of said image-frames at said n+1 ordinally-arranged successively lower pixel-density levels 0 . . . n in Laplacian format.

5. The image processing system defined in claim 1 wherein n is at least 2 and said second hardware means comprises a single motion-vector stage that employs feedback for deriving respective motion-vector outputs at each of pixel density levels n . . . n−k.

6. The image processing system defined in claim 1 wherein k=t (t an integer less than n), and said second hardware means further includes means responsive to motion vectors of level n−t for generating further motion vectors, each of which is representative of motion of respective S×R matrices of pixels at resolution level 0 (S and R are integers).

7. The image-processing system defined in claim 1 wherein k=1, and said second hardware means further includes means responsive to motion vectors of level 0 for generating further motion vectors each of which is representative of an S×R matrix of motion vectors of level 0 (S and R are integers).

8. The image processing system defined in claim 7 wherein said means for generating further motion vectors forms the averages of respective S×R matrices of motion vectors.

9. The image-processing system defined in claim 1, wherein:

said first hardware means comprises an ordinally-arranged pyramid of n cascaded image stages, with said high-resolution image data at pixel-density level 0 being applied as an input to a 1st of said n cascaded image stages and a Gaussian output from each of said cascaded image stages 1 . . . (n−1) being applied as an input to its immediately following one of said n cascaded image stages; and said second hardware means comprises an ordinally-arranged plurality of n cascaded motion-vector stages, with an output from each of said n cascaded image stages being individually applied as an input to a corresponding one of said n cascaded motion-vector stages and an output from each of said cascaded motion-vector stages n . . . 2 being applied as an input to its immediately preceding one of said n cascaded motion-vector stages, with (1) all of said motion-vector stages 1 . . . n including its own individual image buffer means, and motion-analysis means and (2) all of said motion-vector stages 1 . . . (n−1) further including its own individual pixel-density expand means, adder means and image warp means;

whereby the output from the 1st of said n cascaded motion-vector stages comprises a separate motion vector for each pixel at said given pixel-density level.

10. The image-processing system defined in claim 9, wherein:

said first hardware means comprises an ordinally-arranged Gaussian pyramid of n cascaded image stages, and said Gaussian output from each of said cascaded image stages 1 . . . (n−1) is the output from each of said n cascaded image stages that is individually applied as an input to a corresponding one of said n cascaded motion-vector stages of said second hardware means.

11. The image-processing system defined in claim 9, wherein:

said first hardware means comprises an ordinally-arranged Laplacian pyramid of n cascaded image stages each of which derives a Laplacian output in addition to its Gaussian output, and said Laplacian output from each of said cascaded image stages 1 . . . (n−1) is the output from each of said n cascaded image stages that is individually applied as an input to a corresponding one of said n cascaded motion-vector stages of said second hardware means.

12. The image-processing system defined in claim 1, wherein the value of n is at least 2, wherein said first hardware means comprises a pyramid consisting of a 1st image stage and image feedback means, and wherein:

said high-resolution image data at pixel-density level 0 is applied as an image input to said 1st image stage and said 1st image stage derives a Gaussian image output at pixel-density level 1; and said image feedback means includes a 2nd image stage and first and second frame buffers, (1) with said Gaussian image output at pixel-density level 1 from said 1st image stage being applied as a first image input to said first frame buffer and each of respective Gaussian image outputs at pixel-density levels 2 . . . n from said 2nd image stage being applied, in sequential order, as a second image input to said first frame buffer, for storing in said first frame buffer all of said Gaussian images outputs at pixel-density levels 1 . . . n applied as image inputs thereto, (2) with each of said stored Gaussian image outputs at pixel-density levels 1 . . . n being read out from said first frame buffer and applied as an image input to said 2nd image stage, and (3) each of respective image outputs at pixel-density levels 1 . . . n from said 2nd image stage being applied, in sequential order, as an image input to said second frame buffer for storing therein all of said image outputs at pixel-density levels 1 . . . n applied as an image input thereto.

13. The image-processing system defined in claim 12, wherein said second hardware means consists of:

a feedback motion-vector stage, responsive to each of said stored image outputs at pixel-density levels n ... 1 being read out, in sequential order, from said second frame buffer and applied as an image input thereto, for deriving a motion-vector output at pixel-density level 1; and a highest-pixel density motion-vector stage, responsive to both image data at pixel-density level 0 and said motion-vector output at pixel-density level 1 from said feedback motion-vector stage being applied as inputs thereto, for deriving a motion-vector output at pixel-density level 0 therefrom.

14. The image-processing system defined in claim 13, wherein:

said pyramid of said first hardware means is a Laplacian pyramid, in which said 1st image stage is a Laplacian image stage and said 2nd image stage of said image feedback means is also a Laplacian image stage;

each of said respective image outputs at pixel-density levels 1 ... n from said 2nd Laplacian image stage applied, in sequential order, as an image input to said second frame buffer is a Laplacian image output from said 2nd image stage; and said image data at pixel-density level 0 applied as an input to said highest-pixel density motion-vector stage is a Laplacian image output from said 1st Laplacian image stage.

15. The image-processing system defined in claim 13, wherein said feedback motion-vector stage comprises:

first means including an image buffer, warp means and motion analysis means, responsive to each of said stored image outputs at pixel-density levels n ... 1 being read out, in sequential order, from said second frame buffer and applied as an image input thereto, for deriving, in sequential order, each of respective motion-vector outputs at pixel-density levels n ... 1;

second means including a summer and a third frame buffer, for applying, in order, each of said respective motion-vector outputs at pixel-density levels n ... 1 as a first input to said summer and applying the output from said summer as an input to said third frame buffer;

third means including an expand-pyramid stage, responsive to a first output of each of said respective motion-vector outputs at pixel-density levels n ... 2 from said third frame buffer of said second means being applied, in sequential order, as inputs to said expand-pyramid stage, for deriving, in sequential order, respective motion-vector outputs from said expand-pyramid stage at expanded pixel-density levels $(n-1)$ ... 1, and applying, in order, each of said respective motion-vector outputs from said expand-pyramid stage at said expanded pixel-density levels $(n-1)$ ... 1 both as a control input to said warp means of said first means and as a second input to said summer of said second means; and a second output from said third frame buffer of said second means constituting said motion-vector output at pixel-density level 1 from said feedback motion-vector stage that is applied as an input to said highest-pixel density motion-vector stage.

16. The image-processing system defined in claim 1, wherein the value of n is at least 2, and wherein said first hardware means comprises a pyramid consisting of a single image stage that employs feedback for deriving respective image outputs at each of pixel-density levels 0 ... n.

17. The image-processing system defined in claim 16, wherein: said second hardware means comprises a single motion-vector stage that employs feedback for deriving respective motion-vector outputs at each of pixel-density levels n ... 0.

18. The image-processing system defined in claim 16, wherein:

said single image stage of said first hardware means comprises convolution filter/decimator means and partitioned line buffer means;

said partitioned line buffer means including a plurality of at least $(n+1)$ separate partitions each of which stores pixels applied thereto and reads out stored pixels therefrom, a first of said plurality of $(n+1)$ partitions storing the Gaussian image data pixels of each of successive scan-lines of an image-frame applied thereto at a pixel-density level 0 that occur at a $CL_0$ input clock frequency, and reads out the pixels stored therein at an increased output clock frequency equal to at least 3/2 of said $CL_0$ input clock frequency;

said convolution filter/decimator means, in response to stored Gaussian image data pixels at each of pixel-density levels 0 to n read out, in sequential order and at said increased output clock frequency, from said plurality of $(n+1)$ separate partitions of said partitioned line buffer means, derives as an output therefrom, at said increased output clock frequency, a scan-line of Gaussian image data pixels at each of at least pixel-density levels 1 to n;

means for storing each of said respective scan-lines of Gaussian image data pixels at each of the pixel-density levels of said output from said convolution filter/decimator means, at said increased output clock frequency, in its corresponding ordinal one of said plurality of $(n+1)$ separate partitions of said partitioned line buffer means; and means, responsive to stored Gaussian image data pixels at each of pixel-density levels 0 to n read out, in a predetermined order and at said increased output clock frequency, from said plurality of $(n+1)$ separate partitions of said partitioned line buffer means, for deriving an output therefrom, at said increased output clock frequency, for application to said second hardware means.

19. The image-processing system defined in claim 18, wherein said partitioned line buffer means includes a plurality of $(2n+2)$ separate partitions comprising said $(n+1)$ separate partitions and an additional $n+1$ separate partitions, each of which separate partitions stores pixels applied thereto and reads out stored pixels therefrom; wherein said convolution filter/decimator means derives as an output therefrom, at said increased output clock frequency, a scan-line of Gaussian image data pixels at each of pixel-density levels 1 to $(n+1)$; and wherein said means for deriving an output therefrom for application to said second hardware means includes:

expander/interpolation filter means subtractor means;

means for applying each of said respective scan-lines of Gaussian image data pixels at pixel-density levels 1 to $(n+1)$ of said output from said convolution filter/decimator means, at said increased output clock frequency, as an input to said expander/interpolation filter;

means for storing each of said respective scan-lines of expanded Gaussian image data pixels, of an output from said expander/interpolation filter means, at pixel-density levels 0 to n and at said increased output clock frequency, in its corresponding ordinal one of said additional separate partitions of said partitioned line buffer means; and means including said subtractor means for deriving the difference between corresponding ones of said stored Gaussian image data pixels at each of pixel-density levels 0 to n, read out in said predetermined order and at said increased output clock frequency, from said first-mentioned (n+1) separate partitions of said partitioned line buffer means and corresponding stored expanded Gaussian image data pixels at each of pixel-density levels 0 to n read out, in said predetermined order and at said increased output clock frequency, from said additional (n+1) separate partitions of said partitioned line buffer means, thereby deriving, in said predetermined order, Laplacian image data pixels at each of pixel-density levels 0 to n for application to said second hardware means.

* * * * *